Feb. 14, 1967   J. H. BERRIAN   3,303,634
APPARATUS AND METHODS FOR SEPARATING LIQUID FROM
A BINARY PHASE LIQUID-GAS MIXTURE
Filed April 20, 1965   2 Sheets-Sheet 1

INVENTOR.
JAMES H. BERRIAN
BY
*Paul M. Klein Jr.*
ATTORNEY

Feb. 14, 1967   J. H. BERRIAN   3,303,634
APPARATUS AND METHODS FOR SEPARATING LIQUID FROM
A BINARY PHASE LIQUID-GAS MIXTURE
Filed April 20, 1965   2 Sheets-Sheet 2
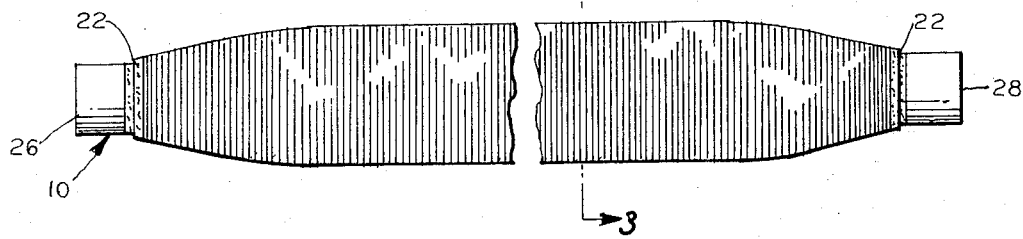
FIG_2
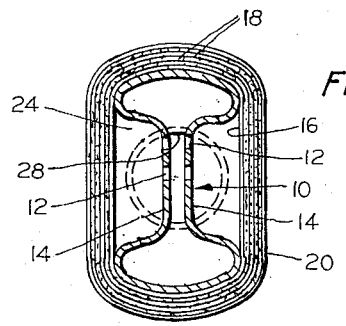
FIG_3
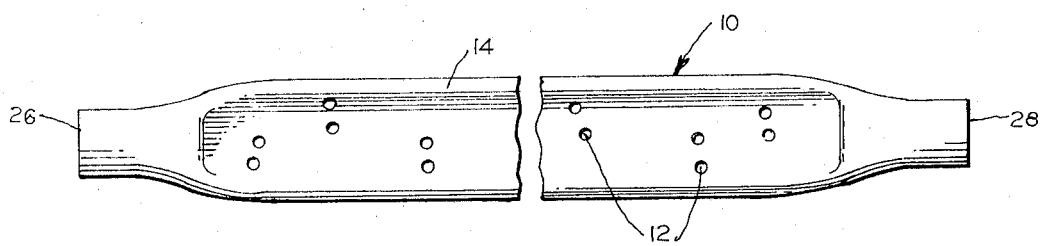
FIG_4
INVENTOR.
JAMES H. BERRIAN
BY
ATTORNEY

United States Patent Office 3,303,634
Patented Feb. 14, 1967

3,303,634
APPARATUS AND METHODS FOR SEPARATING LIQUID FROM A BINARY PHASE LIQUID-GAS MIXTURE
James H. Berrian, 409 Rowland Ave., Camarillo, Calif. 93010
Filed Apr. 20, 1965, Ser. No. 449,655
4 Claims. (Cl. 55—35)

The invention described herein may be manufactured and used by or for the Government of the United States of America for governmental purposes without the payment of any royalties thereon or therefore.

This application is a continuation-in-part of my copending application serial No. 110,279, filed May 15, 1961 and now U.S. Patent 3,225,524.

This invention relates to apparatus and methods for separating liquid from a binary phase mixture of liquid and gas. More particularly the invention relates to apparatus and methods for the separation and recovery of liquid from a binary phase mixture of liquid and gas which are operable under altered gravitational forces such as encountered during flight in space vehicles.

Altered gravitational forces encountered in missile and space flight, ranging from high acceleration on take-off to weightlessness during free-fall, present certain special problems in the manipulation of binary phase liquid-gas mixtures which do not find ready solution in the prior art technology. Under static terrestrial conditions phase separation of such binary phase, liquid-gas mixtures as water and steam, liquid oxygen-oxygen vapor systems is simply accomplished by permitting gravity or centrifugal force to set on the phases which are of different density, thereby forming a boundary or surface between them. Under conditions of changing acceleration patterns, vibration, and weightlessness, phase boundaries undergo disorientation within their containers. In such cases, even the displacement of a liquid from a vessel by its vapor or by another gas presents the difficult problem.

An object of the present invention is to provide a system for the condensation, absorption, and recovery of vapor molecules from a gaseous medium, such as, specifically, the removal of water vapor from sealed cabin environments under altered gravitational forces encountered during flight in space vehicles.

Another object of this invention is to provide a device for the selective separation of liquid from a binary phase mixture of liquid and gases, ensuring the collection of the liquid without admixture of the gaseous phase.

Other objects, advantages and novel features of the invention will become apparent from the following detailed description when considered in conjunction with the accompanying drawings wherein:

FIG. 2 is a side view of another preferred embodiment of the invention made essentially by mounting filter paper on a suitable support to facilitate transmission of liquid through the filter paper in a direction perpendicular to the plane of the filter paper;

FIG. 3 is a cross section of the embodiment of FIG. 2 taken along the line 3—3; and FIG. 4 is a side elevation view of the tube of the embodiment of FIG. 2 prior to the mounting of the filter paper on it.

Figure 1:
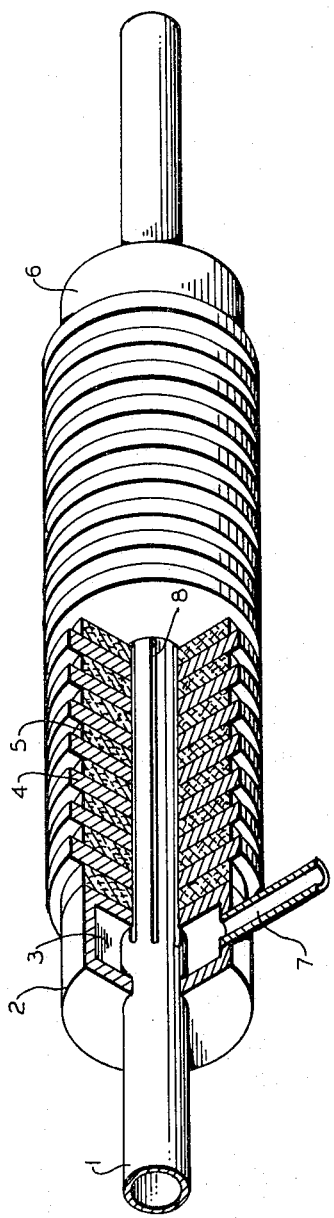
FIG. 1 is an axonometric view, partly in cross section, of one preferred embodiment of the apparatus of the invention using filter paper mounted for transmission of fluid therethrough along the direction of the plane of the filter paper.

In essence, the apparatus of the invention comprises a body of porous material capable of being wetted by the liquid to be separated and capable of transmitting the liquid by capillary action; in addition, the apparatus includes means for subjecting the porous body to a pressure differential, not exceeding the hereinafter-defined critical phase partition pressure differential, to cause the liquid to pass through the capillary pores of the porous body.

Comprehended within the concept of the invention is the discovery that, when a porous solid body, wettable by, and capable of transmitting by capillary action, a particular liquid, is placed in contact with the liquid in a binary phase mixture of that liquid with a gaseous phase, then, under certain specified conditions of operation, which depend on the composition of the solid body and the properties of the liquid, the liquid can be easily displaced through the porous body by a slight pressure differential, without the passage of the gaseous phase. Upon these conditions the porous body accomplishes partition of the liquid and gaseous phases. Above a certain critical maximum pressure differential both liquid and gas will pass through the porous body. Liquid can be displaced through the body by the least force, provided that the body is wetted on both surfaces so that, in effect, by virtue of capillary action, the body is wet along the entire length of the capillaries through which the liquid is to pass. However, much higher force is required to drive gas through the porous body. The porous body of this inention can evidently be regarded as a solid matrix traversed by pores of capillary size, that is, of microscopic cross-section. Thus the porous body can be regarded as a membrane which serves as a filter capable of selecting the liquid from a binary phase liquid-gas mixture and refusing to pass the gas phase. This principle of operation of the porous body with a pressure differential across it not exceeding the critical phase partition pressure differential can be termed "selective phase filtration." The elements that are capable of such operation are termed "selective phase filters."

To carry out a method of the invention, such a selective phase filter is disposed with one region or surface thereof in contact with liquid in a binary phase mixture of liquid and gas, and the filter is then subjected to a pressure differential between this first surface or region of the filter and a second region or surface of the filter to which second region or surface the liquid is to be driven. The higher of the pressures constituting the pressure differential is maintained at the first region. This first region of the filter is therefore sometimes hereinafter called the high pressure side or high pressure surface of the filter. When this pressure differential is kept at a value not exceeding the critical phase partition differential, then liquid, but not gas, is driven through the capillary pores of the filter from the region of the filter in contact with the binary phase mixture. Thus, the first region of the filter is also sometimes hereinafter called the gas side of the filter for the reason that gas is present on and remains on this side of the filter.

As is abundantly clear from the previous description of the principle of this invention and the apparatus and method described hereinbefore in general terms, when the membrane of the invention is wetted with liquid on one surface, for example the surface to be subjected to higher pressure (hereinafter sometimes called the high pressure surface or high pressure side), capillary action causes some of the liquid to travel in the membrane toward the opposite surface of the membrane (hereinafter sometimes called low pressure surface or side since it is subjected to lower pressure). The high pressure surface would, absent any applied pressure differential across the membrane, remain wet. If now no further liquid is applied to the high pressure surface of the membrane and if a pressure differential not exceeding the critical phase partition pressure differential is now applied across the membrane, then the liquid is pulled toward the low pressure side of the membrane causing the high pressure side of the membrane to become dry to the touch. Gas is prevented from flowing through the membrane so long as a pressure differential is maintained across the membrane which does not exceed the critical phase partition pressure differential. Liquid is able to pass through the membrane, but no gas will pass through. The procedure for determining whether the applied pressure difference is not in excess of the critical phase partition pressure differential is simply to observe what happens to the wetted membrane upon application of a pressure difference subsequent to the wetting of the membrane. Under the action of the pressure difference, liquid flows out of the low pressure side of the membrane and, assuming no new liquid is applied to the high pressure surface of the membrane, the high pressure surface becomes dry to the touch, and the low pressure surface is sealed by a liquid film. If during this procedure it is observed that no gas passes through the membrane, either while the membrane is wet on the high pressure or gas side or while it is dry on the high pressure or gas side, then the criterion has been met: the pressure difference does not exceed the critical phase partition pressure differential. This behavior of the membrane undergoing this procedure is, indeed, implicit in the definition of the term "critical phase partition pressure differential."

Although the foregoing description adequately teaches the practice of the invention, an elaboration of the theory of operation is given herewith to facilitate the understanding of the physics of the invention. With no replenishing flow of liquid onto the high pressure surface of the membrane, liquid will, as previously mentioned, pass through the membrane until the high pressure surface of the membrane becomes dry to the touch. The last bit of liquid in a capillary passage in the membrane will then find itself being followed by gas. As this last bit of liquid reaches the low pressure surface of the membrane, it will form a film of liquid across the opening of the capillary passage at the low pressure surface of the membrane. This film will be expanded by the gas behind it acting under a pressure differential. This constitutes the start of the process of forcing a gas bubble through a hole in a membrane. The process involves an increase in surface area of the gas-liquid interface as the bubble attempts to go through the hole. By calculating the increase in surface area associated with forcing the gas bubble through the hole in the membrane, it is possible to calculate the minimum pressure required.

It can be demonstrated mathematically, according to this invention, that the pressure required to expand the surface area of the gas-liquid interface by a small increment with respect to a small increment in volume of the bubble will pass through a maximum. In the case of a circular hole, for example, this maximum occurs when the liquid-gas interface, which will assume a spherical shape under the action of surface tension, has been expanded to the point where its radius is equal to the radius of the circular hole. In this manner, a rough estimate can be made of the minimum pressure required to force the gas bubble through a hole in a membrane using the well known difference in the internal energy per unit area of the surface of a liquid and the bulk of a liquid and the well known temperature coefficient at constant composition of the surface tension. By maintaining the pressure difference in the present invention at a value less than this minimum, gas is prevented from passing through the membrane. The critical phase partition pressure differential is thus seen to be readily defined at the maximum pressure differential which can be applied across the membrane without permitting gas to pass through the membrane.

As is evident from the foregoing explanation, when a membrane is wetted and subjected to a pressure difference not exceeding the critical phase partition pressure differential, liquid will be drawn across the membrane and out of the low pressure side of the membrane until only a very small amount of liquid remains, forming films or bubbles at the low pressure side of the membrane which seal the capillary openings into the low pressure region against the passage of gas. It is thus obviously an inherent attribute of the phenomenon of critical phase partition pressure differential that the high pressure side of the membrane will become dry to the touch and will remain dry unless it is again wetted by replenishing liquid deposited on the high pressure side.

In carrying out the method of this invention, after the membrane has once been wetted to provide the liquid necessary to form the sealing film across the open end of each capillary at its low pressure side, a pressure differential not exceeding the critical phase partition pressure differential is applied and maintained across the membrane. The maintenance of this pressure differential, i.e., within the range upper limit is the critical phase partition pressure differential, can thus obviously be seen to maintain the membrane impervious to the passage of gas whether or not liquid is deposited against the high pressure or gas side of the membrane after the initial wetting of the membrane. That is, the maintenance of this desired pressure insures the maintenance of the membrane impervious to the passage of gas during both the presence and the absence of continuous deposition of liquid against the high pressure region of the membrane so long as the desired pressure differential is maintained during both the presence and absence of continuous deposition of liquid against the high pressure region of the membrane.

To recapitulate, the present invention functions in the following manner. The membrane is wetted at its high pressure side to provide the liquid necessary to form a sealing film across the opening of each capillary at the low pressure side of the membrane. A pressure differential not exceeding the critical phase partition pressure differential is established and maintained across the membrane. Initially, this will cause liquid to pass through the capillary and out of the membrane into the low pressure region resulting in the high pressure or gas side of the membrane becoming dry to the touch with thus no longer any film of liquid on the gas side of the membrane. This also results in the formation, with the last little bit of liquid in each capillary, of a film of liquid constituting a gas bubble sealing the opening of the capillary at the low pressure side or surface of the membrane. This bubble will remain in this sealing position indefinitely so long as the pressure differential does not exceed the aforementioned critical value. This maximum allowable pressure can readily be ascertained empirically by simply giving the membrane an initial wetting with no replenishment of liquid and applying a gradually increasing pressure difference across the membrane until the maximum pressure difference is attained at which no gas passes through the membrane. If additional liquid is deposited on the high pressure or gas side of the membrane, it will again wet the membrane and liquid will pass through the membrane without the passage of any gas. If the liquid is deposited continuously against the high pressure side of the membrane, that side will remain continuously wet. If the liquid is deposited sporadically in isolated drops on the high pressure side at a rate lower than the rate at which liquid travels through and out of the membrane under the action of the pressure differential, then the high pressure or gas side of the membrane will be generally alternately wet and dry to the touch.

If the pressure difference applied across the membrane, after the initial wetting of the high pressure or gas side of the membrane, does exceed the critical phase partition pressure differential then, after the gas side of the membrane has become dry, the excessive pressure difference will force the gas to drive away from the membrane the liquid films sealing the openings of the capillaries on the low pressure side of the membrane. Gas will thereupon pass through the membrane entering the low pressure region of the system through these openings of the capillaries on the low pressure side of the membrane where the liquid film seals have been broken. The passage of any gas through the membrane under these conditions is a criterion for concluding that the pressure difference exceeds the critical phase partition pressure differential.

Thus, it is seen that, according to the invention, once the membrane has been initially wetted, it is, by the use of the proper pressure differential, maintained impervious to the transmission of gas through it even though the high pressure surface or gas side of the membrane becomes, after its initial wetting, dry and thereafter remains dry.

One useful system for the employment of the invention involves the production of water by the extraction of water vapor from an atmosphere, such as air containing water vapor, which would typically be found in a sealed cabin of a space vehicle. Conveniently such a system would involve condensation of the steam or water vapor on, or near enough to, the high pressure region of a selective phase filter so that liquid water contacts the high pressure region of the filter. This condition can be accomplished either by cooling the high pressure region of the filter sufficiently to produce condensation directly on it or by cooling a body in close juxtaposition to the high pressure region of the filter so that a droplet, for example, of water formed on the adjacent body will extend into contact with the high presure region of the filter. By maintaining the filter under a pressure differential not exceeding the critical phase partition pressure differential, the water formed on the filter from the condensation of the water vapor from the atmosphere is caused to pass through the filter to the exclusion of the gaseous phase and can thus be collected from the low pressure region of the filter.

Apparatus for carrying out the condensation of vapor, such as steam, can be constructed by the incorporation of cooled thermal conductors within the composition of the matrix or by constructing the matrix to be of material sufficiently thermally conductive so as to serve as its own cooled condensing surface. This latter type of condensation can make use of such porous, heat-conducting bodies as metals, made by powder metallurgy. In all such cases where the apparatus embodies condensation as one of its functions the apparatus becomes a condenser-collector and heat exchanger.

Reference is now made to the drawing which shows one preferred embodiment of an apparatus of the present invention intended as a thermally-conductive selective phase filter, forming part of an operational complex including a binary phase mixture of water in liquid and vapor states, to be used in a vapor condenser-collector system for removal of water vapor from air. This embodiment includes a metal tube 1 made of any good heat conductor which can carry a satisfactory coolant. In one model, dural has been used quite satisfactorily. Tightly fitting on the tube 1 is an end plate 2 forming one wall of a collecting chamber 3 for compressing a stack of alternate discs of heat-conductive metal 4 and filter paper discs 5 against an opposite end plate 6. The conducting metal discs 4 have also satisfactorily been made of dural.

The filter paper discs have been found quite satisfactory when made of glass fiber. The metal discs 4 are mounted in good contact, for heat-conducting relation, with tube 1. By means of a vacuum applied to the nipple 7 extending from the chamber 3, a pressure differential is produced radially across the filter discs 5. Flutes or shallow grooves 8 formed on the exterior of tube 1 receive water issuing from the inner periphery of the discs 5 and transmit the water to the collecting chamber 3.

A particular model of this embodiment using a dural tube with an outer diameter of 1.3 cm., dural discs 1.01" in thickness and 2.2 cm. in outer diameter, and using glass fiber filter paper 1.01" in thickness and 2.1 cm. in outer diameter exhibited a critical partition pressure differential of 30" of water. The critical partition pressure differential for any operational complex having different constituent elements can readily be determined by trying out various pressure differentials and observing the maximum differential which permits only liquid and no gaseous phase to pass through the filter.

*Operation*

To carry out the method of the invention with the aforedescribed embodiment of the apparatus, a refrigerant is circulated through the tube 1 causing the plates 5 to be cooled by heat conduction to tube 1. Water droplets are formed by condensation of vapor on the outer surface of the condensing plates 5. The droplets on the plates grow in size until they make contact with the glass fiber filter elements and they are then immediately drawn into the matrix by capillary action. Providing that a slight pressure differential is maintained across the porous body, the water is transferred through the glass fiber discs into the collecting channels 8 and thence into the collecting chamber 3. As long as this pressure differential does not exceed the critical partition pressure differential, which for this embodiment is 30" of water, gaseous medium is not passed through the porous, capillary-active elements.

Reference is now made to a second preferred embodiment of the apparatus of the invention shown in FIGS. 2, 3, and 4. This embodiment is made of a tube generally indicated at 10 which can conveniently be of dural or other suitable material. This tube is flattened along a portion of its length as is evident in FIG. 4 to convert this length into a configuration exhibiting a dumbbell-shape cross-section as shown particularly in FIG. 3. Holes 12 are provided to permit the passage of fluid from the recessed external surfaces 14 of the flattened portion of the tube into the lumen of the tube. The flattened portion of the tube is wrapped over its length with a continuous winding of stranded monofilament glass thread 16. Over this layer of thread 16 there is wrapped filter paper 18, conveniently of the same type used in the apparatus of FIG. 1, made out of glass fiber, and of any suitable thickness such, for example, as .004". Several layers of filter paper can be used. A typical model uses five layers of such filter paper which are supported by the layer of wound glass thread. Applied over the paper is a wrapping over its entire length of another layer 20 of stranded monofilament glass thread. Epoxy cement 22, or the like, applied at each end of the wrapping, secures the composition and seals the ends against leakage. Tubes of this type have a high flow and they will support pressures of the order of 10 cm. Hg, for example, without rupture. The glass threads support the filter paper and protect it from damage. The dumbbell-shape cross-section and the holes 12 in the recessed portion serve to provide channels to facilitate the flow of liquid into the lumen of the tube from whatever place on the low pressure side of the membrane it happens to arrive in the course of its transmission through the membrane. For example, any droplets of liquid passing through that portion of the membrane which spans the channel-shaped depressions of the flattened portion of the tube can easily traverse the empty space 24 and land directly on the surface 14 and proceed without difficulty to the nearest hole 12 for entry into the lumen of the tube. A source of reduced pressure can be applied to the ends 26 and 28 of the tube to provide the necessary pressure differential across the membrane to cause the flow of liquid and prevent the transmission of gas.

*Operation*

To carry out the method of the invention with the embodiment of the apparatus shown in FIGS. 2, 3 and 4, liquid is applied to the outer surface of the membrane of FIGS. 2 and 3 either by dropping the liquid onto the glass fiber, or by blowing it off a condensing surface onto the glass fiber, or by placing the glass fiber in contact with cooled ribs or the like on which liquid condenses. When the outer surface of the device is wetted by liquid, capillary action draws the liquid into the membrane. A differential pressure is then applied to the membrane by, for example, connecting the ends 26, 28 of the tube 10 to a source of reduced pressure. The pressure differential is maintained at a value not exceeding the critical phase partition pressure differential. This causes liquid to pass through the membrane, thence onto the surfaces 14 of the channels of the tube 10, and thereafter through the holes 12 into the lumen of the tube, whence the liquid can be collected. So long as the pressure differential across the membrane does not exceed the critical phase partition pressure differential, no gas passes through the membrane.

Obviously, many modifications and variations of the present invention are possible in the light of the above teachings. It is therefore to be understood that within the scope of the appended claims the invention may be practiced otherwise than as specifically described.

What is claimed is:

1. A method for extracting and separating liquid from a gas phase which comprises
    contacting with the gas phase one region of a porous, solid matrix of material wettable by the liquid and having pores of capillary dimensions, maintaining said first mentioned region of said matrix at a temperaiton low enough to produce condensation at said first mentioned region of liquid from said gas phase so that said first mentioned region is exposed in contact with a binary phase mixture of said gas phase with said liquid condensed from said gas phase; and
    maintaining a pressure differential between said first mentioned region of said porous matrix and a second region of said matrix not in contact with said binary phase mixture, the higher of the two pressures constituting the pressure differential being maintained at said first mentioned region;
        said pressure differential not exceeding the critical phase partition pressure differential but being sufficiently great to cause liquid deposited on the surface of said matrix at said first mentioned region to travel into said matrix away from said surface to the extent that said surface becomes dry in the event that said liquid deposited on said surface is not continuously replaced with other liquid;
        said pressure differential being maintained during both the presence and absence of continuous deposition of liquid against the high-pressure region of said matrix and insuring maintenance of said matrix impervious to the passage of gas during both the said presence and absence of continuous deposition of liquid against the high-pressure region of said matrix.

2. A method for separating liquid from a binary phase mixture of liquid and gas which comprises:
    contacting with the liquid one region of a porous, solid body wettable by the liquid and capable of transmitting the liquid by capillary action;
    said first region of said body located in contact with said binary phase liquid-gas mixture is maintained at a temperature low enough to produce condensation thereat of liquid from said binary phase mixture;
    subjecting said porous body, between said first mentioned region thereof and a second region thereof, in order to cause said liquid to flow from said first region to said second region, to a pressure differential not exceeding the critical phase partition pressure differential but sufficiently great to cause liquid deposited on the surface of said body at said first mentioned region to travel into said body away from said surface to the extent that said surface becomes dry in the event that the said liquid deposited on said surface is not continuously replaced with other liquid; and
    maintaining said pressure differential during both the presence and absence of continuous deposition of liquid against said first region of said body, thus insuring maintenance of said body impervious to the passage of gas during both the said presence and absence of continuous deposition of liquid against said first region.

3. A method for separating liquid from a binary phase mixture of liquid and gas which comprises:
    contacting with the liquid one region of a porous, solid body wettable by the liquid and capable of transmitting the liquid by capillary action;
    maintaining a second body in contact with said binary phase liquid-gas mixture and at a temperature sufficiently low to produce condensation on said second body of liquid from said binary phase mixture;
    maintaining said first region of said porous body in sufficiently close juxtaposition to said second body to contact liquid condensed on said second body;
    subjecting said porous body, between said first mentioned region thereof and a second region thereof, in order to cause said liquid to flow from said first region to said second region, to a pressure differential not exceeding the critical phase partition pressure differential but sufficiently great to cause liquid deposited on the surface of said body at said first mentioned region to travel into said body away from said surface to the extent that said surface becomes dry in the event that the said liquid deposited on said surface is not continuously replaced with other liquid; and
    maintaining said pressure differential during both the presence and absence of continuous deposition of liquid against said first region of said body, thus insuring maintenance of said body impervious to the passage of gas during both the said presence and absence of continuous deposition of liquid against said first region.

4. A method for separating liquid from a binary phase mixture of liquid and gas which comprises contacting with the liquid one region of a porous, solid matrix of material wettable by the liquid and having pores of capillary dimensions, said region being exposed in contact with the binary phase mixture; and maintaining a pressure differential betwen said first mentioned region of said porous matrix and a second region of said matrix not in contact with said binary phase mixture, the higher of the two pressures constituting the pressure differential being maintained at said first mentioned region; said pressure differential not exceeding the critical phase partition pressure differential but being sufficiently great to cause liquid deposited on the surface of said matrix at said first mentioned region to travel into said matrix away from said surface to the extent that said surface becomes dry in the event that the said liquid deposited on said surface is not continuously replaced with other liquid; said pressure differential being maintained during both the presence and absence of continuous deposition of liquid against the high-pressure region of said matrix and insuring maintenance of said matrix impervious to the passage of gas during both the said presence and absence of continuous deposition of liquid against the high-pressure region of said matrix; maintaining a body in contact with said binary phase mixture at a temperature low enough to produce condensation on said body of liquid from said binary phase mixture and maintaining said first mentioned region of said matrix in sufficiently close juxtaposition to said body so that liquid condensed on said body touches said first mentioned region.

References Cited by the Examiner
UNITED STATES PATENTS
2,857,979  10/1958  Van Dijck _____ 55—431

REUBEN FRIEDMAN, *Primary Examiner.*

C. HART, *Examiner.*